United States Patent [19]

Hansen, II

[11] Patent Number: 5,052,869
[45] Date of Patent: Oct. 1, 1991

[54] TIE DOWN ASSEMBLY

[75] Inventor: William S. Hansen, II, Waukegan, Ill.

[73] Assignee: A. L. Hansen Mfg. Co., Waukegan, Ill.

[21] Appl. No.: 574,600

[22] Filed: Aug. 29, 1990

[51] Int. Cl.$^5$ .............................................. B61D 45/00
[52] U.S. Cl. .................................... 410/111; 410/101
[58] Field of Search ............... 410/101, 111, 106, 107, 410/108, 109, 112, 113, 116; 16/122, 123, 125, 126, 127; 248/499, 508; 403/209

[56] References Cited

U.S. PATENT DOCUMENTS

| 3,300,171 | 1/1967 | Watts | 410/116 |
| 3,377,039 | 4/1968 | Hayes | 410/112 |
| 3,831,532 | 8/1974 | Smith et al. | 410/107 |
| 4,907,921 | 3/1990 | Akright | 410/111 |

OTHER PUBLICATIONS

A. L. Hansen Commercial & Industrial Hardware, pp. 121 and 122.
Austin Suppliers of Industrial, Vehicle and Commercial Hardware, pp. 314–319.
BPC Buyers Products Co., 1984 Catalog, p. 61.

Primary Examiner—Frank E. Werner
Assistant Examiner—James Eller
Attorney, Agent, or Firm—Willian Brinks Olds Hofer Gilson & Lione

[57] ABSTRACT

A tie down assembly includes a mounting plate and a cross bar. The cross bar defines an integral post and two opposed recesses which receive ends of a tie down bail. The integral post passes through a bearing washer and a central opening in the central panel and defines an enlarged head that secures the tie down assembly together.

5 Claims, 1 Drawing Sheet

TIE DOWN ASSEMBLY

BACKGROUND OF THE INVENTION

This invention relates to a tie down assembly of the type used to secure cargo in place in a vehicle, trailer or container.

In the past, several types of tie down assemblies have reached widespread acceptance. A first approach uses a D-ring formed of circular cross-section, heavy gauge wire which is pivotably mounted within a U-channel that is in turn welded in place. This tie down assembly does not allow the channel to rotate in use, and welding operations are required to mount the assembly in place. Two examples of this approach are identified as lashing rings B40 and B50 as distributed by the Buyers Products Company.

A second approach is to provide a sheet metal bracket that surrounds a D-ring at least partially. The bracket is in turn secured in place, as for example with threaded fasteners. This approach provides a light weight, low cost design, but the pull capacity of commonly available models is limited. Examples of this type of tie down assembly are shown in U.S. Pat. No. 4,907,921, assigned to the assignee of the present invention, and cargo tie down models 39F and 300F of the A. L. Hansen Mfg. Co.

A third approach is to provide a metal cup that defines a recess in which a cross bar is pivotably mounted with a threaded fastener that defines a pivot axis. The cross bar defines a stud at each end, and a rectangular section bail is mounted onto these studs. An example of this approach is shown as model 10-40 of A. L. Hansen Mfg. Co. This approach requires a threaded fastener to secure the cross bar in place, and this threaded fastener can be a point of weakness. Additionally, a threaded fastener may unduly increase the cost to manufacture such a tie down.

A fourth approach utilizes a ring to which is secured an axle that passes through a mounting post. An example of this approach is shown as model CAT-340 of Austin Hardware.

It is an object of this invention to provide a tie down assembly which is unusually simple and inexpensive to manufacture while simultaneously being unusually strong and reliable in use. It is a further object of this invention to completely avoid the use of removable fasteners such as threaded fasteners in such a tie down assembly.

SUMMARY OF THE INVENTION

According to this invention, a tie down assembly is provided comprising a mounting plate having a central panel and a peripheral flange. The central panel is recessed with respect to the flange to form a central recess, and the central panel defines the central opening. A cross bar is mounted in the recess and defines a central section interposed between two end sections. The central section comprises a post that extends through the central opening. This post has an enlarged head that positively captures the central panel between the head and the central section while allowing rotation of the cross bar in the recess about a rotation axis defined by the post. The enlarged head and post are integral with the central section and the end sections. Each of the end sections defines a rear surface adjacent to the central panel, an end surface, and a recess that opens both at the rear surface and at the end surface. A tie down bail having a convex central portion and two opposed end portions is provided, with each of the end portions positioned in a respective one of the recesses such that the tie down bail is free to pivot with respect to the cross bar. The recesses are shaped to allow the end portions of the tie down bail to pass into and out of the recesses at the rear surfaces, such that the central panel prevents the end portions of the tie down bail from moving out of the recesses.

By using an integral post in the cross bar, and by enlarging the head of the post after the bail has been assembled with the cross bar and the plate, all removable fasteners such as threaded fasteners are eliminated. This minimizes the manufacturing costs of the tie down assembly of this invention, and yet results in an unusually strong and reliable device.

The invention itself, together with further objects and attendant advantages, will best be understood by reference to the following detailed description, taken in conjunction with the accompanying drawings.

BRIEF DESCRIPTION OF THE DRAWINGS

FIG. 3b is a cross-sectional view taken along line 3b—3b of FIG. 3a.

DETAILED DESCRIPTION OF THE PRESENTLY PREFERRED EMBODIMENTS

Figure 1:
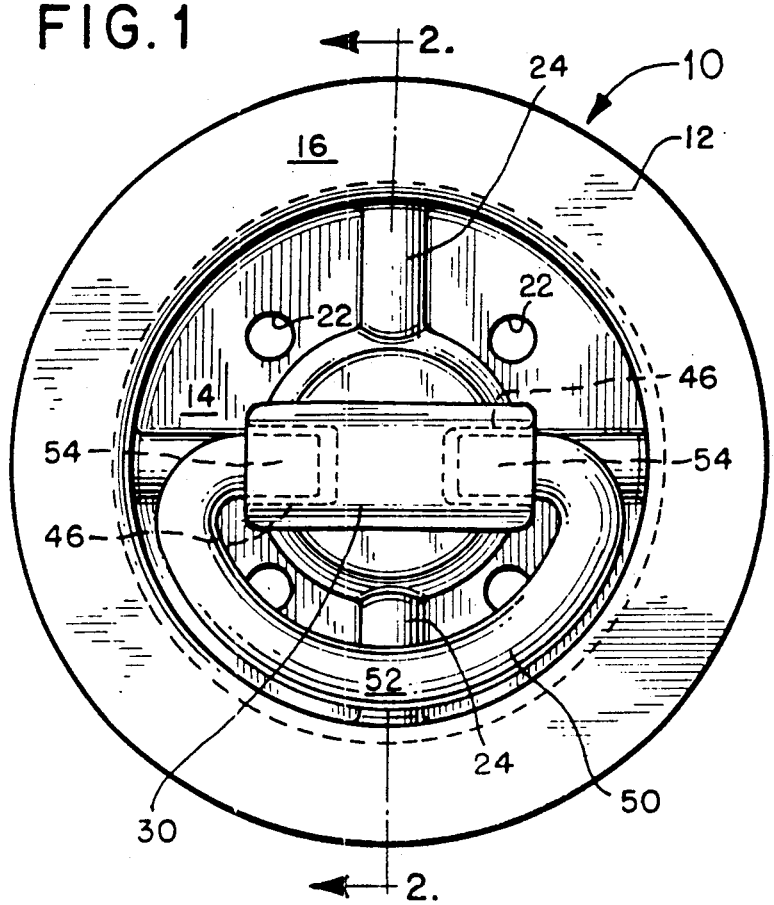
FIG. 1 is a plan view of a tie down assembly which incorporates a presently preferred embodiment of this invention.
Figure 2:
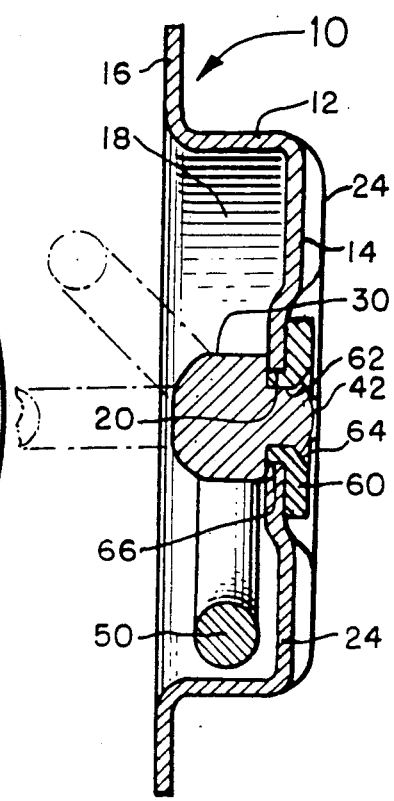
FIG. 2 is a cross-sectional view taken along line 2—2 of FIG. 1.

Turning now to the drawings, FIGS. 1 and 2 show overall views of a tie down assembly 10 which incorporates a presently preferred embodiment of this invention. The tie down assembly 10 is made up of four component parts: a mounting plate 12; a cross bar 30; a tie down bail 50; and a bearing washer 60.

The mounting plate 12 includes a central panel 14 which is recessed with respect to a flange 16 to form a recess 18. The central panel 14 defines a central opening 20 and an array of mounting openings 22. Ribs 24 are formed in the central panel 14 as stiffeners.

Figure 3A:
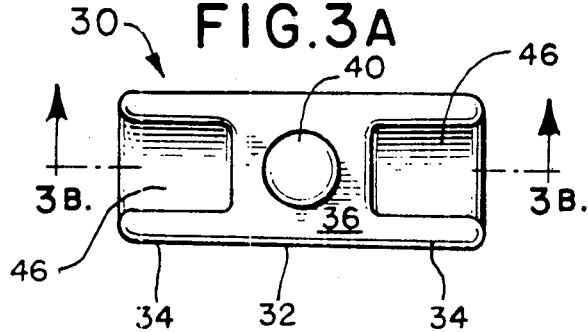
FIG. 3a is a plan view of the cross bar of FIGS. 1 and 2, before the post of the cross bar has been enlarged during the assembly operation.
Figure 3B:
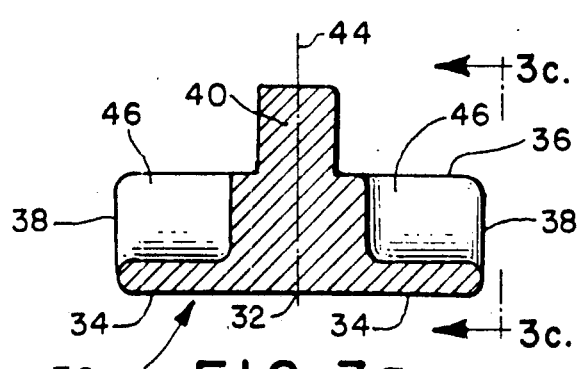
Figure 3C:
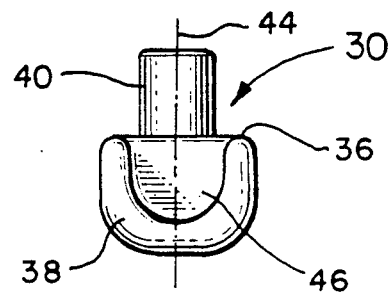
FIG. 3c is an end view taken along line 3c—3c of FIG. 3b.

As shown in FIGS. 1 and 2, the cross bar 30 is mounted centrally in the recess 18. The cross bar 30 is shown in detail in FIGS. 3a through 3c, and it includes a central section 32 interposed between two end sections 34. Each of the end sections 34 defines a rear surface 36 and an end surface 38. The rear surfaces 36 are positioned adjacent the central panel 14 when the cross bar 30 is assembled as shown in FIGS. 1 and 2. Returning to FIGS. 3a-3c, the central section 32 defines an integral post 40 which defines a rotation axis 44. Each of the end sections 34 defines a recess 46 that opens out at both the rear surface 36 and the end surface 38. The cross bar 30 is preferably an integral forging in which the post 40 is integral with the central and end sections 32, 34. In alternate embodiments, a casting may be used.

Returning to FIGS. 1 and 2, the tie down bail 50 has a convex central portion 52 and a pair of opposed end portions 54. The end portions 54 each fit into a respective one of the recesses 46 at the rear surface 36 such that the tie down bail 50 is free to rotate by 180° in the recesses 46. As shown in FIG. 2, the bail 50 is circular in cross-section, and the bail 50 is preferably formed out of a circular cross-section wire.

As best shown in FIG. 2, the bearing washer 60 is interposed in the central opening 20 between the central panel 14 and the post 40. The bearing washer 60 defines an opening 62 which receives the post 40, a flared surface 64, and a flange 66.

The tie down assembly 10 is assembled by first placing the end portions 54 of the tie down bail 50 in the recesses 46. Then the bearing washer 60 is assembled with the mounting plate 12 in the configuration shown in FIG. 2, and the post 40 is passed through the opening 62 of the washer 60. The end of the post 40 is then enlarged to form an enlarged head 42. This is preferably done in an orbital spinning operation, well known to those skilled in the art. Of course, alternate methods can be used for enlarging the post 40 to form the head 42. For example, heat disruption and pressure, welding, riveting, and swaging techniques can be used. The post 40 is preferably expanded into contact with the flared surface 64 in order positively to capture the cross bar 30 in place. The flange 66 prevents over tightening and ensures that the cross bar 30 remains free to rotate by a full 360°. Also, the bearing washer 60 spreads the pulling load applied to the tie down bail 50 to a larger area of the central panel 14 and thereby inhibits pull out. Once the assembly 10 has been completed as shown in FIG. 2, the central panel 14 prevents the end portions 54 of the tie down bail 50 from moving out of the recesses 46, and the tie down bail 50 is positively captured in place.

Because the integral post 40 is enlarged to form the head 42, no threaded fasteners or the like are required. This reduces fabrication costs and provides a particularly strong and reliable arrangement. Furthermore, since the end portions 54 of the bail 50 slip into the recesses 46 at the rear surfaces 36, a pivotal connection between the bail 50 and the cross bar 30 is provided without any fasteners, studs or openings in the bail.

The following details of construction are provided merely to define the presently preferred embodiment of this invention. Of course, these details are in no way intended to be limiting.

In this embodiment, the central panel 14 is approximately 4½ inches in diameter and the mounting plate 12 is formed of hot rolled steel approximately 0.12 inches in thickness. The cross bar 30 in this embodiment is made of 1040 forged steel, and the post is approximately 0.49 inches in diameter. The bail 50 in this embodiment is formed of 1041 spherodized annealed steel wire having an initial diameter of 0.50 inches, heat treated to 44 to 46 on the Rockwell C scale. The bearing washer 60 in this embodiment is formed of 12 L 14 cold drawn steel with added lead. Finishes can vary as desired, but in this preferred embodiment the mounting plate 14 is zinc plated and the tie down bail 50 is mechanically zinc plated.

Of course, a wide variety of changes and modifications can be made to the preferred embodiment described above. For example, the post 40 can be welded in place on the cross bar 30, after which time the post 40 can properly be considered integral with the central section 32. The mounting openings 22 can be formed on the flange 16 rather than the central panel 14, and of course the configuration of the mounting openings 22 can be varied as desired. It is therefore intended that the foregoing detailed description be regarded as illustrative rather than limiting, and that it be understood that it is the following claims, including all equivalents, which are intended to define the scope of this invention.

I claim:

1. A tie down assembly comprising:
   a mounting plate having a central panel and a peripheral flange, said central panel recessed with respect to the flange to form a central recess, said central panel defining a central opening;
   a cross bar mounted in the central recess, said cross bar having a central section interposed between two end sections;
   said central section comprising a post that extends through the central opening, said post having an enlarged head that positively captures the central panel between the head and the central section while allowing rotation of the cross bar in the central recess about a rotation axis defined by the post, said enlarged head and post being integral with the central section and the end sections;
   each of said end sections defining a rear surface adjacent the central panel, an end surface, and a bail receiving recess that opens both at the rear surface and the end surface; and
   a tie down bail having a convex central portion and two opposed end portions, each of said end portions positioned in a respective one of the bail receiving recesses such that the tie down bail is free to pivot with respect to the cross bar;
   said bail receiving recesses shaped to allow the end portions of the tie down bail to pass into and out of the bail receiving recesses at the rear surface such that the central panel prevents the end portions of the tie down bail from moving out of the bail receiving recesses.

2. The invention of claim 1 wherein the post and the cross bar are formed as an integral forging, and wherein the post is enlarged to form the head after the cross bar and tie down bail are assembled to the mounting plate.

3. The invention of claim 2 wherein the end portions of the tie down bail are substantially circular in cross section.

4. The invention of claim 3 wherein the mounting plate defines a plurality of mounting openings.

5. The invention of claim 4 further comprising a bearing washer interposed around the post between the enlarged head and the central panel.

* * * * *